Sept. 29, 1959 S. A. HIRSH 2,906,235

FREQUENCY ADJUSTMENT PLATING CONTROL

Filed March 22, 1957

2 Sheets-Sheet 1

INVENTOR.
STANLEY A. HIRSH

BY Kenyon & Kenyon

ATTORNEYS

Sept. 29, 1959
S. A. HIRSH
2,906,235
FREQUENCY ADJUSTMENT PLATING CONTROL
Filed March 22, 1957
2 Sheets-Sheet 2

INVENTOR.
STANLEY A. HIRSH
BY
Kenyon & Kenyon
ATTORNEYS

United States Patent Office 2,906,235

Patented Sept. 29, 1959

2,906,235

FREQUENCY ADJUSTMENT PLATING CONTROL

Stanley A. Hirsh, Valley Stream, N.Y., assignor to Bulova Research and Development Laboratories, Inc., Woodside, N.Y., a corporation of New York Application March 22, 1957, Serial No. 647,784

8 Claims. (Cl. 118—8)

The present invention relates generally to the manufacture of frequency control devices, and more particularly to apparatus for automatically plating a piezoelectric crystal so as to adjust its resonance frequency to a predetermined value.

Piezoelectric crystals are widely used as resonators, electrical filters and in other frequency control systems. In the manufacture of such elements, one of the critical processes involves the vacuum evaporation of a metallic layer onto one or both faces of the crystal wafer so as mechanically to load it, thereby reducing the crystal frequency to an assigned value. Since the crystals when manufactured in large scale production exhibit a considerable variation in frequency, the final plating adjustment must be made carefully on an individual basis before the crystal is permanently sealed in its casing. Some frequency shift is encountered during sealing and in aging, apart from the excursion which results from a non-zero temperature coefficient. Consequently at this stage the nominal frequency must be approached with considerable precision.

The customary practice in the quartz crystal manufacturing industry, in the final plating operation, is to compare the frequency of the element being processed to that of a standard element and to read the difference on a frequency meter. The evaporation of the metal in vacuo on the crystal face is governed manually by an operator. This is effected by intermittent evaporation under operator control until the frequency value, as indicated by the meter, is reduced to the proper point.

The ability to reach this point without overshooting depends on the adroitness and care exercised by the operator and entails delicate control operations when the critical point is approached. Upon attaining the proper point, the element plated has a frequency corresponding to that of the standard and the process is completed.

In an operator-controlled process it is necessary for the operator to control the length of time the plating button is depressed in order to control the frequency difference between the plated crystal and the standardized element. It is also essential for the operator to adjust the time interval between adjacent pulses of metal vapor so as to allow the crystal temperature to stabilize and thereby prevent frequency overshoot. Moreover, since the frequency difference is indicated on a meter, the operator is called upon to change scales in the course of plating to maintain optimum meter accuracy.

From the foregoing, it is apparent that the manually-controlled process involves a considerable measure of skill and judgment on the part of the operator. Great care must be exercised and the productivity of the operator cannot be increased without sacrificing the quality of the product.

In view of the foregoing, it is the principal object of the invention to eliminate the need for manual skills and to provide an automatic plating process which adjusts the frequency of a crystal resonator with a high order of precision by the vacuum evaporation of a metallic loading substance onto the face of the crystal. While the invention is described herein in connection with crystal resonators, it is to be understood that the invention is equally applicable to other forms of resonators, such as tuning forks and magnetostrictive rods whose operating frequency may be adjusted by plating to an assigned value.

More particularly, it is an object of the invention to provide an automatic plating apparatus which is adapted to evaporate metal from a hot filament while the crystal is being oscillated, and which acts to control the rate of evaporation from the filament and the amount of metal reaching the crystal as a function of the difference between the measured frequency of the crystal and a reference standard.

Among the significant features of the invention are a continuous correction of the crystal temperature, whereby minimum time is lost in waiting, and an automatic shut-off of the system when the desired frequency is reached. The invention obviates the need to read or change meter scales in the course of plating.

Also, an object of the invention is to provide plating apparatus which operates at high speed to produce frequency-adjusted crystals which are uniformly of high accuracy.

Another difficulty experienced in crystal plating is the unavoidable heating of the crystal due to radiation from the evaporation filament. This causes the crystal to operate at a difference value from that it would have under ambient temperature conditions and so causes a drift after shut-off. Accordingly, it is another object of the invention to minimize the error arising from heating of the crystal in the course of plating.

Briefly stated, in a plating apparatus according to the invention, the rate of evaporation and the amount of metal arriving at the crystal are controlled by the difference between the frequency of the crystal being plated and a reference frequency. The temperature of the evaporation filament is controlled by a circuit responsive to the difference frequency. In addition, a shutter interposed between the filament and the crystal being plated is oscillated intermittently to block the flow of evaporated metal molecules when the difference frequency falls below a predetermined value. As the difference frequency is further decreased the shutter cycle is altered whereby the exposure of the crystal to the flow of evaporated metal is lessened. When the frequency difference reaches zero or a predetermined value relative to the standard, the shutter operation is arrested and the filament is shut off.

For a better understanding of the invention as well as other objects and further features thereof, reference is had to the following detailed description to be read in connection with the accompanying drawings, wherein like components in the figures are identified by like reference numerals.

Figure 1:
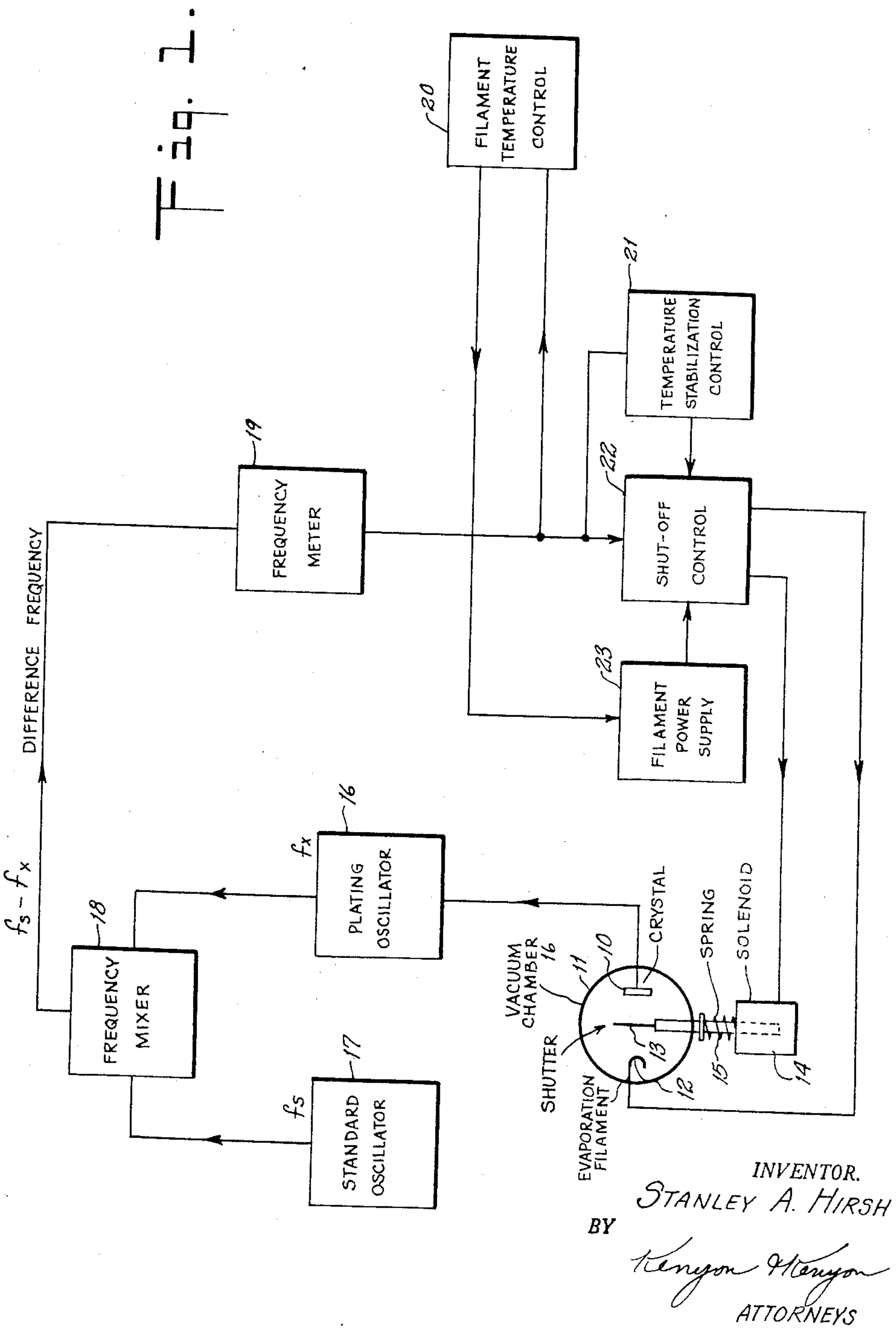
Fig. 1 is a block diagram of an automatic plating system in accordance with the invention.

Referring now to the drawings, and more particularly to Fig. 1, the crystal 10 to be plated is inserted in a suitable vacuum chamber, represented by circle 11, in which is mounted an evaporation heater 12 in the form of a tungsten filament. A charge of metal, such as a gold staple, is placed on the filament, the metal being vaporized and condensing on the surface of the crystal to be plated. The metal layer acts mechanically to load the crystal, thereby reducing its operating frequency.

The system disclosed in connection with Fig. 1 is designed automatically to control the plating process as a function of the operating frequency of the crystal unit whereby plating is continued until a point is reached at which the crystal frequency is at an assigned value determined with reference to a frequency standard.

Interposed between the crystal 10 and the evaporation filament in vacuum chamber 11 is a shutter 13 which is retractable by means of an external solenoid 14, the arrangement being such that when the solenoid is de-energized, the shutter is projected to block the diffusion path between the filament and the crystal. When the solenoid is energized, the shutter is withdrawn from the vapor path, permitting the flow of metal molecules to impinge on the face of the crystal. A spring 15 acts to return the shutter to its blocking position upon de-energization of the solenoid.

Crystal 10 is connected in an oscillator circuit, represented by block 16, which generates a voltage wave whose frequency is dependent on the electro-mechanical transduction characteristic of the associated crystal. The frequency of the oscillator 16 is progressively reduced in the course of plating by reason of the loading effect of the plated metal on crystal 10.

Also provided is a reference oscillator, represented by block 17, which includes a stabilized crystal operating at the desired frequency. The respective outputs of standard oscillator 17 and plating oscillator 16 are applied to a frequency converter or mixer 18 which yields additive and difference beat frequency components. The difference frequency derived from the mixer 18 is fed to a frequency meter 19 which preferably is of the type disclosed in the copending application of Hirsh for "Direct Reading Frequency Meter," Ser. No. 640,361, filed February 15, 1957, and which generates a square wave control voltage of constant amplitude and of 50 percent duty cycle, independent of the wave shape of the input voltage.

Thus the frequency of the voltage produced by the frequency meter is directly related to the difference frequency upon which the ultimate accuracy of the plated frequency resonator will depend, and is independent of the wave shape or amplitude of the difference frequency voltage. The control voltage from the frequency meter is fed simultaneously to a filament temperature control circuit 20, a temperature stabilization control circuit 21 and a shut-off control circuit 22. The manner in which the control voltage from the frequency meter acts upon the filament temperature control, stabilization and shut-off circuits is as follows:

*Filament temperature control*

The filament temperature control circuit 20 serves to control the evaporation rate of metal from the evaporation filament 12. It is necessary to reduce the evaporation filament temperature as the difference frequency reaches the shut-off point, or too much material will be deposited on the surface of the crystal and a defective product will be produced. It is likewise desirable to keep the evaporation rate high so as to reduce the processing time.

The filament temperature control 20 satisfies both conditions by continuously lowering the evaporation filament temperature as metal is deposited by the filament power supply, the temperature being highest when the frequency difference in the applied control voltage is greatest. The filament temperature control 20 which responds to the difference voltage from frequency meter 19 acts to control the voltage supplied by the filament power supply 23 to the evaporation filament 12.

*Temperature stabilization control*

The temperature stabilization control circuit 21 responds to the difference frequency from the frequency meter 19 to adjust the amount of radiant heat impinging on the crystal surface when the frequency adjustment process nears completion. All quartz frequency resonators exhibit a frequency variation with temperature no matter how highly corrected. This variation in frequency under actual plating conditions is usually well in excess of the tolerance allowed for the finished product. It was heretofore necessary for a skilled operator to remove power from the evaporation filament so as to allow the crystal to cool down as the desired frequency was approached and alternately to apply and remove power until the desired frequency was attained.

This control causes the shutter 13 to remain fully open when the frequency difference between the crystal being adjusted and the standard crystal is large, but as the shut-off point is approached, the shutter is alternately opened and closed, thereby exposing the crystal surface to the radiant heat of the filament for an ever decreasing period until such time as the crystal being plated arrives at the desired frequency.

*Shut-off control*

Shut-off control circuit 22 acts in response to the beat frequency from the meter 19 to turn off the power to the evaporation filament 12 fed thereto by the filament supply 23 when the crystal reaches the desired frequency. It also simultaneously interposes the shutter 13 between the filament and the crystal to prevent any further plating.

Figure 2:
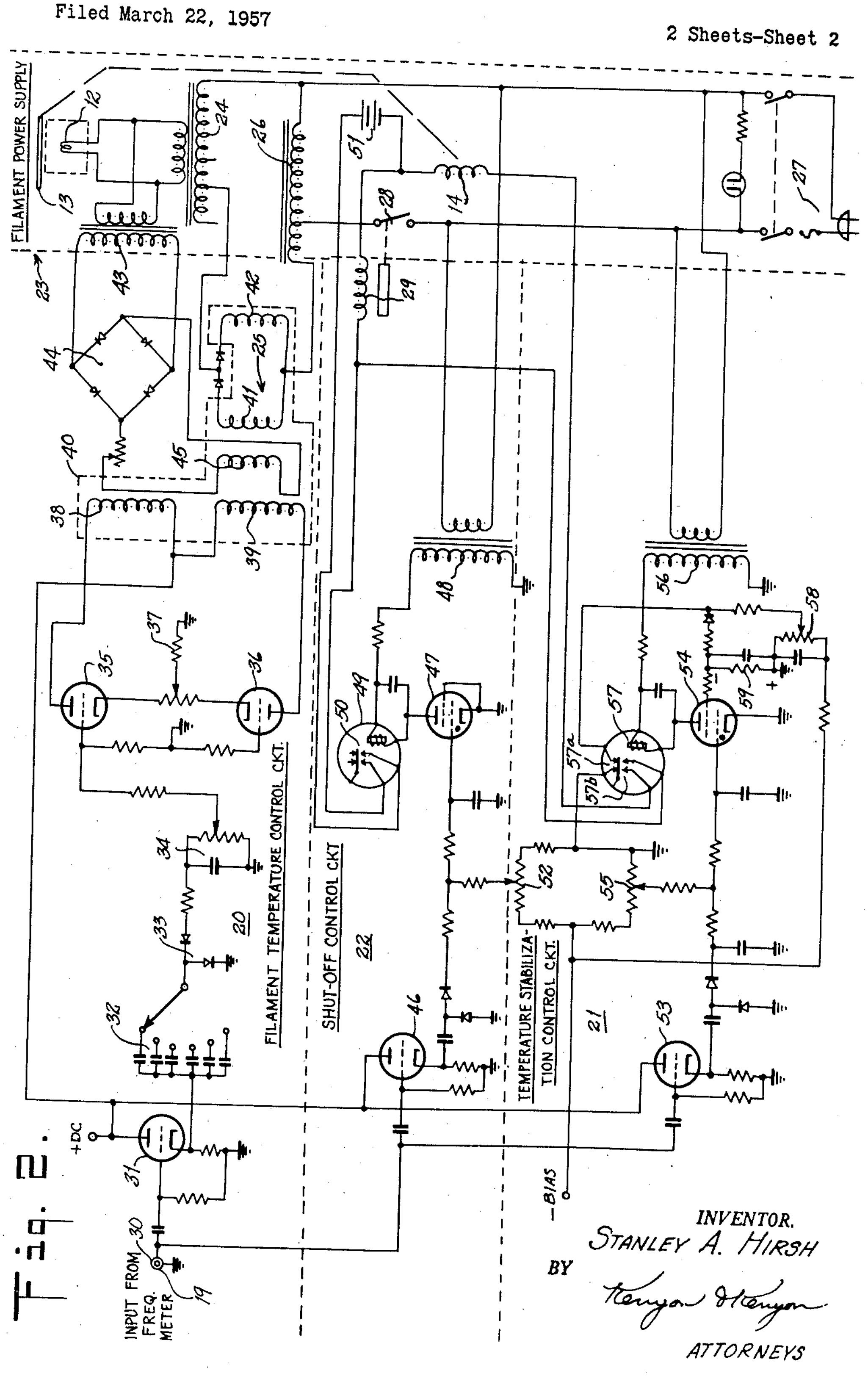
Fig. 2 is a schematic circuit diagram of the system.

Referring now to the schematic diagram shown in Fig. 2, the filament power supply, generally designated by numeral 23, includes a filament transformer 24 whose secondary is connected to the evaporation filament 12. The primary of the transformer 24 is connected through a variable reaction device 25 to an auto-transformer 26 connected to the power line circuit 27. The voltage applied to the filament is controlled by the variable reactance device 25, and this in turn is governed by the filament temperature control circuit, generally designated by numeral 20.

Interposed between the power line 27 and the auto-transformer 26 is a relay-actuated shut-off switch 28, the solenoid 29 of the relay being controlled by the shut-off control circuit, generally designated by numeral 22. The operation of the solenoid 14 for the shutter 13 is controlled by the temperature stabilization control circuit 21.

Let us now consider the structure and operation of the filament temperature control circuit 20. The square wave difference frequency input from the frequency meter 19 is applied to terminal 30 which is connected to a cathode-follower stage including triode 31. The output of cathode-follower stage 31 is fed to a differentiating circuit selectively including one of the capacitors 32, the differentiated voltage is rectified by diodes 33 and the rectified pulses are integrated by R-C network 34 to provide a direct-current voltage whose level depends on the difference frequency of the input wave. The voltage therefore is the analog of the input frequency.

The direct-current voltage is impressed on the grid of triode 35 in a paraphase amplifier further including a triode 36. The balance of tubes 35 and 36 is controlled by a potentiometer 37 common to the cathode circuits of both tubes, whereby in the absence of an input direct-current voltage on the grid of tube 35, equal and opposite anode currents are produced in the coils 38 and 39 connected in the respective anode circuits of the tubes.

Coils 38 and 39 are the primaries of a saturable reactor 40. The saturable reactor further includes load coils 41 and 42 which form part of the reactance device 25.

When direct-current voltage is applied to the grid of tube 35, the current balance in the coils 38 and 39 is upset, and the resultant effect on the reactance of load coils 41 and 42 is such as to decrease the reactance introduced by device 25 to an extent depending on the direct-current level. Conversely, as the direct-current level decreases when the difference frequency approaches the assigned value, the increasing reactance introduced in the filament supply circuit reduces the filament voltage, thereby lowering the filament temperature. The temperature is highest when the frequency difference in the applied voltage from the frequency meter is greatest, and the temperature is progressively lowered as the assigned frequency is approached.

To stabilize the relationship between filament voltage and the input frequency to the temperature control circuit 20, a negative feedback system is provided comprising a transformer 43, a rectifier bridge 44 and a reactance coil 45 incorporated in the saturable reactor 40. The primary of transformer 43 is connected across the filament 12, hence the voltage impressed thereacross is the filament voltage. The secondary voltage of transformer 43 is rectified and applied to coil 45 in the saturable reactor so as to vary the operating point in the saturation curve in a manner effecting stabilization.

Referring now to the shut-off control circuit 22, the input wave from terminal 30 is applied to a cathode-follower stage including triode tube 46 whose output is differentiated, rectified and integrated to provide a direct-current analog to the input voltage. This direct-current voltage is applied as a positive bias to the grid electrode of a thyratron 47 on whose anode is applied an alternating voltage taken from the secondary of a transformer 48. Interposed in the anode circuit is the solenoid of a relay 49 which actuates a normally open switch 50.

Switch 50 is connected in a circuit between a battery 51 and the solenoid 29 of the cut-off relay 28. Thus relay 28 is energized to close its switch and apply voltage to the filament supply only when relay 49 is energized to close switch 50. And switch 50 is caused to close only when the direct-current applied to the grid of thyratron 47 has a positive value of sufficient magnitude to override the effect of a negative bias taken from a bias control potentiometer 52. The bias value is adjusted so that when the difference frequency attains the desired value, the resultant positive analog voltage on the grid of the thyratron 47 is insufficient to ignite the tube, as a consequence of which relay 49 is de-energized and cut-off relay 28 is likewise de-energized to break the filament supply circuit. The de-activation of cut-off relay 28 also acts to interrupt the circuit between battery 51 and the shutter solenoid 14, causing the shutter to spring back into its blocking position and thereby preventing any further plating of the crystal in the chamber.

We shall finally consider the structure and behavior of the temperature stabilization control circuit 21. The difference frequency wave from terminal 30 is applied to a cathode-follower including triode 53 whose output is differentiated, rectified and integrated to produce a direct-current analog voltage which is impressed as a positive bias on the ignition grid of a thyratron 54. Also applied to the grid is a fixed negative bias derived from a control potentiometer 55. The anode voltage is taken from an alternating voltage supply including transformer 56. Interposed in the anode circuit is the solenoid of a relay 57 having a switch provided with a set of upper contacts 57*a* and a set of lower contacts 57*b*. The bias voltage applied to the shield grid of thyratron 54 is taken from a potentiometer 58 and is maintained by an R-C circuit 59. When the thyratron 54 is non-conductive and relay 57 is de-energized, a ground potential is applied to the shield grid circuit through upper relay contacts 57*a*. When the direct-current analog voltage is sufficient to ignite the thyratron 54, the relay 57 is energized, thereby closing lower contacts 57*b* which completes the circuit for the shutter actuating solenoid 14, thereby removing the shutter 13 from the diffusion path in the chamber. At the same time, energization of relay 57 causes upper contacts 57*a* to open, to remove the ground from the shield grid circuit, and causing a negative bias to be applied thereto depending on the voltage developed across R-C circuit 59. The point at which thyratron 54 re-ignites depends on the magnitude of direct-current analog voltage applied to the grid. Consequently, thyratron 54 is rendered alternately conductive, the ratio of the conductive period to the non-conductive period or duty cycle depending on the magnitude of the analog voltage.

Shutter 13 is therefore caused to remain fully open when the frequency difference between the crystal being plated and the standard crystal is large. But as the shut-off point is approached, the shutter is alternately opened and closed, thereby exposing the crystal surface to the radiant heat of the filament for an ever decreasing period until such time as the crystal being plated has attained the desired frequency.

While there has been shown what at present is considered to be a preferred embodiment of the invention, it is to be understood that many changes and modifications may be made therein without departing from the essential spirit of the invention. It is intended, therefore, in the accompanying claims to cover all such changes and modifications as fall within the true spirit of the invention.

What is claimed is:

1. Apparatus for vacuum plating a crystal element supported in a vacuum chamber so as to adjust its resonance frequency to an assigned value, said apparatus comprising an electrical filament in said chamber for evaporating metal onto the surface of said element so as mechanically to load it and thereby reduce its operating frequency, a filament supply circuit to energize said heater to a desired temperature, an oscillator including said element, a frequency standard, a frequency meter coupled to said oscillator and said standard to produce a beat frequency dependent on the difference therebetween, and means responsive to said beat frequency to adjust said filament supply as a function of frequency in a direction gradually reducing said temperature as said beat frequency decreases.

2. Apparatus for vacuum plating a piezoelectric crystal element supported within a vacuum chamber so as to adjust its resonance frequency to an assigned value, said apparatus comprising an electrical filament in said chamber for evaporating metal onto the surface of said element so as mechanically to load it and thereby reduce its operating frequency, a filament supply circuit to energize said heater to a desired temperature, an oscillator including said element, a frequency standard, a frequency meter coupled to said oscillator and said standard to produce a beat frequency dependent on the difference therebetween, and means responsive to said beat frequency to control said filament supply to reduce said temperature as said beat frequency decreases, said last named means including a reactance device interposed in said filament supply and amplifier means coupled to said reactance device and responsive to said beat frequency to increase the reactance thereof as said beat frequency is reduced.

3. Apparatus for vacuum plating a crystal element supported in a vacuum chamber so as to adjust its resonance frequency to an assigned value, said apparatus comprising an electrical filament in said chamber for evaporating metal onto the surface of said element so as mechanically to load it and thereby reduce its operating frequency, a filament supply circuit to energize said heater to a desired temperature, an oscillator including said element, a frequency standard, a frequency meter coupled to said oscillator and said standard to produce a beat frequency dependent on the difference therebetween, means responsive to said beat frequency to control said filament supply as a function of frequency to reduce gradually said temperature as said beat frequency decreases, a removable shutter interposable between said filament and said element to block the flow of metal molecules thereto, and means responsive to said beat frequency to operate said shutter intermittently when the beat falls below a predetermined frequency value.

4. Apparatus for vacuum plating a crystal element supported in a vacuum chamber so as to adjust its resonance frequency to an assigned value, said apparatus comprising an electrical filament in said chamber for evaporating metal onto the surface of said element so as mechanically to load it and thereby reduce its operating frequency, a filament supply circuit to energize said heater to a desired temperature, an oscillator including said element, a frequency standard, a frequency meter coupled to said oscillator and said standard to produce a beat frequency dependent on the difference therebetween, means responsive to said beat frequency to control said filament supply as a function of frequency to reduce gradually said temperature as said beat frequency decreases, a removable shutter interposable between said filament and said element to block the flow of metal molecules thereto, means responsive to said beat frequency to operate said shutter intermittenly when the beat falls below a predetermined value, and means to shut off said filament supply when said beat attains an assigned value.

5. Apparatus for vacuum plating a crystal element supported in a vacuum chamber so as to adjust its resonance frequency to an assigned value, said apparatus comprising an electrical filament in said chamber for evaporating metal onto the surface of said element so as mechanically to load it and thereby reduce its operating frequency, a filament supply circuit to energize said heater to a desired temperature, an oscillator including said element, a frequency standard, a frequency meter coupled to said oscillator and said standard to produce a beat frequency dependent on the difference therebetween, a filament temperature control circuit responsive to said beat frequency to adjust said filament supply as a function of frequency to reduce gradually said temperature as said beat frequency decreases, a temperature stabilization control system including a removable shutter interposable between said filament and said element to block the flow of metal molecules thereto and means responsive to said beat frequency to operate said shutter alternately when the beat falls below a predetermined value, and a shut-off control circuit including means to shut off said filament supply when said beat attains an assigned value.

6. Apparatus, as set forth in claim 5, wherein said filament temperature control circuit includes means to produce an analog voltage depending on said beat frequency, a reactance device interposed in said filament circuit, and an amplifier responsive to said analog voltage and coupled to said reactance device to increase the reactance as the analog voltage is reduced.

7. Apparatus, as set forth in claim 5, wherein said temperature stabilization control system includes means to produce an analog voltage depending on said beat frequency, and means responsive to said analog voltage to vary the duty cycle of said alternately operating shutter.

8. Apparatus, as set forth in claim 5, wherein said shut-off control circuit includes means to produce an analog voltage depending on said beat frequency, and means responsive to said analog voltage to interrupt said filament supply when said voltage falls below a given value.

References Cited in the file of this patent

UNITED STATES PATENTS

| | | |
|---|---|---|
| 2,445,310 | Chilowsky | July 20, 1948 |
| 2,630,780 | Falck | Mar. 19, 1953 |
| 2,746,420 | Steigerwald | May 22, 1956 |